United States Patent
Rameshni et al.

(10) Patent No.: US 8,425,874 B2
(45) Date of Patent: Apr. 23, 2013

(54) PROCESS FOR THE PRODUCTION OF SULFUR FROM SULFUR DIOXIDE WITH TAIL GAS RECYCLE

(75) Inventors: Mahin Rameshni, Monrovia, CA (US); Stephen L Santo, La Crescenta, CA (US)

(73) Assignee: Rameshni & Associates Technology & Engineering, Monrovia, CA (US)

( * ) Notice: Subject to any disclaimer, the term of this patent is extended or adjusted under 35 U.S.C. 154(b) by 0 days.

(21) Appl. No.: 13/153,422

(22) Filed: Jun. 4, 2011

(65) Prior Publication Data
US 2012/0308474 A1    Dec. 6, 2012

(51) Int. Cl.
*C01B 17/04* (2006.01)
(52) U.S. Cl.
USPC .............. 423/573.1; 423/574.1; 423/576.2
(58) Field of Classification Search .......... 423/573.1, 423/574.1, 576.2
See application file for complete search history.

(56) References Cited

U.S. PATENT DOCUMENTS

| | | | |
|---|---|---|---|
| 1,967,263 A | 7/1934 | Rosenstein | |
| 3,199,955 A | 8/1965 | West et al. | |
| 3,579,302 A * | 5/1971 | Sefton | 423/574.1 |
| 3,928,547 A | 12/1975 | Wilkalis et al. | |
| 3,961,035 A | 6/1976 | Mickley | |
| 4,039,650 A | 8/1977 | Daley | |
| 4,094,961 A | 6/1978 | Beavon | |
| 4,117,100 A | 9/1978 | Hellmer et al. | |
| 4,146,580 A | 3/1979 | Beavon | |
| 4,207,304 A | 6/1980 | Beavon | |
| 4,404,180 A | 9/1983 | Drum et al. | |
| 7,485,281 B2 | 2/2009 | Rameshni | |
| 7,708,967 B2 * | 5/2010 | Mesters et al. | 423/242.1 |
| 2004/0022721 A1 * | 2/2004 | Watson et al. | 423/574.1 |

* cited by examiner

Primary Examiner — Timothy Vanoy (57) ABSTRACT

The reduction of the gas stream containing sulfur dioxide to elemental sulfur is carried out by reacting a reducing gas, such as natural gas, methanol or a mixture of hydrogen and carbon monoxide, with recycled sulfur and recycled tail gas to produce a stream containing hydrogen sulfide that may be reacted with the gas stream that contains sulfur dioxide. Gas streams with a molar concentration of sulfur dioxide from 1 to 100% may be processed to achieve nearly 100% sulfur recovery efficiency.

45 Claims, 3 Drawing Sheets

PROCESS FOR THE PRODUCTION OF SULFUR FROM SULFUR DIOXIDE WITH TAIL GAS RECYCLE

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING

Not Applicable

REFERENCE TO A TABLE

Not Applicable

REFERENCE TO A COMPUTER PROGRAM LISTING COMPACT DISK APPENDIX

Not Applicable

BACKGROUND OF THE INVENTION

1. Field of the Invention

This disclosure relates generally to processes for the production of elemental sulfur from sulfur dioxide, and more particularly to processes for the recovery of sulfur from effluent streams containing sulfur dioxide.

2. Description of the Related Art

Sulfur dioxide is found in many industrial gases emanating from plants involved in roasting, smelting and sintering sulfide ores, or gases from power plants burning high sulfur coal or fuel oils or other sulfurous ores or other industrial operations involved in the combustion of sulfur-bearing fuels, such as fuel oil. One of the more difficult environmental problems facing industry is how to economically control $SO_2$ emissions from these sources.

Several processes schemes have been developed to recover elemental sulfur from $SO_2$ streams. There are several fundamental problems common to these efforts. In particular, byproduct formation of $H_2S$, $CS_2$, COS, $H_2$ and CO reduces sulfur recovery and fuel efficiency and requires larger equipment because of the increased gas flow. Soot formation reduces the quality of the sulfur product and fouls the equipment and catalyst beds reducing the reliability of the unit.

Thermal Reduction of $SO_2$ to Sulfur was developed during 1909-11, S. W. Young investigated reduction of $SO_2$ with methane and other hydrocarbons on a laboratory scale, (Fleming, E. P., and Fitt, T. C., High Purity Sulfur from Smelter Gases—Reduction with Natural Gas, Ind. Eng. Chem., 42, 2249-2253, November 1950). In a 1934 article, Yushkevich, and others, discuss in detail the various possible reaction products from the combination of $SO_2$ and a hydrocarbon reducing agent, including $H_2S$, COS, $CS_2$ and sulfur. Experiments suggested 900-1000° C. as the optimum temperature. (Yushkevich et al, Article Z H. KHIM. PROM., No. 2, 33-37, 1934. and U.S. Pat. No. 3,928,547, Process for the Reduction of Sulfur Dioxide, Daley, W. D., Wilkalis, J. E., and Pieters, W. J. M., Allied Chemical Corp., Dec. 23, 1975). In 1938, American Smelting and Refining Company (ASARCO) initiated investigations, which soon indicated that relatively low-grade $SO_2$ might be directly converted to reasonably pure sulfur by reduction with natural gas. (Fleming, E. P., and Fitt, T. C., High Purity Sulfur from Smelter Gases—Reduction with Natural Gas, Ind. Eng. Chem., 42, 2249-2253, November 1950). Laboratory and small-scale pilot operations were gradually expanded until a semi-commercial 5-tpd unit was operated during 1940-45. Gas from copper roasters or converters containing 5-8% $SO_2$ and 9-12% oxygen was combusted with sufficient natural gas to consume all the oxygen to $CO_2$, plus additional fuel to react with an appropriate portion of the $SO_2$ according to the following overall reaction with $CH_4$ as shown in the following reaction:

$$2SO_2 + CH_4 \rightarrow 2H_2O + CO_2 + S_2$$

Considerable quantities of byproduct $H_2S$, COS and $CS_2$ were formed as well. Furnace temperatures of at least 1250° C. were considered necessary to minimize soot, which will discolor the sulfur. The gases were then cooled and passed through a series of Claus stages for hydrolysis of COS and $CS_2$ to $H_2S$ and reaction of residual $H_2S$ and $SO_2$ to sulfur according to the Claus reaction. This process is still employed today where potential sulfuric acid supply exceeds demand.

In 1978, Davy Power gas GmbH proposed a staged combustion process where hydrocarbon gas is burned at near stoichiometric conditions, followed by injection of supplemental $CH_4$ and $SO_2$ which react to form elemental sulfur. (U.S. Pat. No. 4,117,100, Hellmer, L., Koller, G., Muddarris, G. R. A., and Sud, K. K., Process for Reduction of Sulfur Dioxide to Sulfur, Davy Powergas GmbH, Sep. 26, 1978). It is also claimed that the presence of water vapor in the $SO_2$ feed stream suppresses soot formation. The process was never commercialized.

Catalytic Reduction of $SO_2$ to Sulfur was considered in a 1934, United Verde Copper Company proposed a process where a portion of the $SO_2$ stream is combined with $CH_4$ at 800-850° C. in the presence of a metal sulphide catalyst to produce $H_2S$, which is subsequently reacted with the remaining $SO_2$ to yield sulfur according to the Claus reaction. (U.S. Pat. No. 1,967,263, Rosenstein, L., Recovery of Sulfur, United Verde Copper Company, Jul. 24, 1934). The Claus stage preferably comprised a bed of granular absorbent, such as bauxite or charcoal, continually wetted by a thin film of liquid water which served to absorb the reaction heat and also carry away the product sulfur for subsequent recovery by filtration or sedimentation. The process was never commercialized. In 1965, Texas Gulf Sulfur patented the reduction of $SO_2$ with hydrocarbons (e.g.: $CH_4$) at 750-1000° C. using a catalyst such as alumina, initially achieving 40-60% sulfur recovery (U.S. Pat. No. 3,199,955, West, J. R., and Conroy, E. H., Process of Reducing Sulfur Dioxide to Elemental Sulfur, Aug. 10, 1965). Two similar catalytic stages typically followed, whereby the second stage achieved at 390° C., with the sequence of Hydrolysis of byproduct COS and $CS_2$ to $H_2S$, Claus reaction of $H_2S$ and $SO_2$ to form sulfur and Reduction of $SO_2$ by CO and $H_2$ to sulfur. Claus reaction of residual $H_2S$ and $SO_2$ further proceeded in the third stage for 95% overall sulfur recovery. No method of controlling the heat release from the reduction reactions is described and the process was never commercialized.

In 1975, Allied Chemical Corp. claimed to have discovered that, at $SO_2$ concentrations on the order of 50% and higher, a small amount of elemental sulfur (0.1-3 mol-% of the feed gas as $S_8$) lowered the initiation temperature for $SO_2$ reduction and favorably moderated the temperature rise and rate. The sulfur also expedited the reaction and minimized byproduct $H_2$, CO, COS and $CS_2$ formation, (U.S. Pat. No. 3,928,547,

Process for the Reduction of Sulfur Dioxide, Daley, W. D., Wilkalis, J. E., and Pieters, W. J. M., Allied Chemical Corp., Dec. 23, 1975). Generation of $H_2$ and CO is particularly counterproductive because it decreases sulfur recovery and fuel efficiency and requires larger equipment because of the increased tail gas volume. In 1977, Allied Chemical presented an innovative 3-bed arrangement that was claimed to optimize reactant concentrations and temperatures, (U.S. Pat. No. 4,039,650, Daley, W. D., Sulfur Dioxide Reduction, Allied Chemical Corp., Aug. 2, 1977). The total $SO_2$ stream is mixed with a portion of the $CH_4$ and passed through the first reactor to effect reduction of a portion of the $SO_2$ to $H_2S$ and sulfur. Exit gas from the first reactor is mixed with the remaining $CH_4$, and the resultant mixture split into two gas streams which are passed, in parallel, through a second and third reactor to further effect reduction of $SO_2$ to $H_2S$ and sulfur. Periodically, the flow in the first and third reactors is reversed to subject them to alternating heat absorbing and desorbing cycles (while the second reactor is always maintained in the same direction). Inlet gas temperatures to the second and third reactors are maintained within desired ranges by bypassing a portion of the $SO_2$ and $CH_4$ around the first reactor. A 25-tpd pilot plant was constructed in 1978 at a 115-MW coal-fired power plant.

The Catalytic Reduction of Sulfur to Intermediate $H_2S$ was considered. Early research on the recovery of sulfur from gypsum ($CaSO_4.2H_2O$) involved reduction roasting of gypsum with coal or natural gas to form calcium sulfide, which was subsequently processed to generate $H_2S$. In the laboratory, elemental sulfur was then produced by reacting $H_2S$ with $SO_2$ at ambient temperature in a liquid medium. That latter concept led the Federal Bureau of Mines, beginning in 1968, to consider absorption of $SO_2$ (from nonferrous smelters) in a liquid medium subsequently regenerated with $H_2S$ to precipitate sulfur. After screening many reagents, an aqueous solution of citric acid neutralized with soda ash to a pH of 4.5 was selected, (Crocker, L., Martin, D. A., and Nissen, W. I., Citrate-Process Pilot-Plant Operation at the Bunker Hill Company, Bureau of Mines Report of Investigations 8374, p. 1-6, 1979). At least three pilot plants were operated during 1971-76. The most recent was located at the Bunker Hill Co.'s lead smelter in Kellogg, Id. In the absence of an external source, $H_2S$ was generated by the reaction of natural gas with sulfur vapor at 650° C. over a proprietary catalyst as shown in the following reaction:

$$CH_4 + 4S \rightarrow CS_2 + 2H_2S$$

The product $CS_2$ was subsequently hydrolyzed with steam in a second catalytic stage at 315° C. as shown in the following reaction:

$$2H_2S + CS_2 + 2H_2O \rightarrow 4H_2S + CO_2$$

The so-called Citrate Process for Claus reaction of $H_2S$ and $SO_2$ within a liquid absorbent was ultimately abandoned due to absorber corrosion and plugging problems. (Kohl, A. L., and Nielsen, R. B., *Gas Purification, Fifth Edition*, p. 564, Gulf Publishing Co., 1997).

During 1978-1980, a series of three U.S. patents by Beavon, D. K., as described below, proposed innovations to reduce equipment costs and improve operability and product quality. A common theme is the efficient reduction of recycled sulfur to $H_2S$ for subsequent reaction with $SO_2$ to produce sulfur, while minimizing the soot formation characteristic of direct $SO_2$ reduction. Sulfur Reduction by Submerged Hydrocarbon Combustion was in a 1978 patent, $H_2$ and CO are initially formed in a reducing gas generator by the partial combustion of a hydrocarbon fuel, with steam injection to suppress soot formation. The fuel can be gaseous (such as methane), liquid (such as kerosene, diesel or other fuel oil) or solid (such as coal or coke), (U.S. Pat. No. 4,094,961, Beavon, D. K., Hydrogen Sulfide Production, Ralph M. Parsons Company, Jun. 13, 1978).

The reducing gas is sparged through molten sulfur, so that combustion temperatures are rapidly quenched by sulfur vaporization. The firing rate is adjusted to produce a 250-450° C. vapor stream with a nominal stoichiometric excess of hydrogen, which is then passed across a fixed cobalt-moly catalyst bed. Elemental sulfur is hydrogenated to $H_2S$. Byproduct COS and $CS_2$ are hydrolyzed to $H_2S$, and CO is hydrolyzed to $CO_2$ and $H_2$. Sufficient reaction heat is generated that multiple beds with inter-stage cooling are typically required. Reactor effluent is cooled in the sulfur cooler to condense any residual sulfur vapor, particularly during non-routine operation, while remaining above the water dew point. The gas is then further cooled to condense most of the water vapor, yielding an $H_2S$-rich stream that can then be reacted with $SO_2$ in a conventional Claus reactor to produce elemental sulfur. The process has not been commercialized. Sulfur Reduction in a Reaction Furnace was in a 1979 patent, hydrogen and CO are similarly generated by partial oxidation of a hydrocarbon, gaseous or liquid, in the first zone of a 2-zone furnace, and a stoichiometric excess of liquid sulfur is injected into the second zone to quench temperatures to 800-1100° C., (U.S. Pat. No. 4,146,580, Beavon, D. K., Process for Hydrogen Sulfide Production, Ralph M. Parsons Company, Mar. 27, 1979).

A portion of the $H_2$ and CO react with the sulfur to form $H_2S$, COS and some $CS_2$, with about 50% of the total $H_2S$ production being achieved in the furnace. The resultant vapor stream is rapidly cooled to 425° C. or less in a waste heat boiler to suppress further formation of undesirable organic sulfur byproducts. The stream is then further cooled to condense and remove most of the residual sulfur. The gas stream is then typically be reheated for conventional catalytic hydrogenation of sulfur and $SO_2$ to $H_2S$, hydrolysis of COS and $CS_2$ to $H_2S$ and hydrolysis of CO to $CO_2$ and hydrogen. The reactor effluent is then cooled by conventional means to ultimately condense most of the water vapor, yielding an $H_2S$-rich gas stream that can be subsequently reacted with $SO_2$ in a conventional Claus reactor to yield elemental sulfur. As with the previous process, this process has not been commercialized.

Thermal Reduction of $SO_2$ was developed in a 1980 patent, a hydrocarbon fuel, gaseous or liquid, is partially oxidized in a reaction furnace to generate $H_2$ and CO and $SO_2$ added to the thermal reaction zone to react with the $H_2$ and indirectly, CO (by virtue of water gas shift to $CO_2$ and $H_2$). The firing rate is adjusted to yield a mixture of $H_2S$ and $SO_2$ in the molar ratio of 2:1 as required by Claus stoichiometry (U.S. Pat. No. 4,207,304, Beavon, D. K., Process for Sulfur Production, Ralph M. Parsons Company, Jun. 10, 1980).

Competing reactions are the formation of COS and $CS_2$ from the reaction of CO and free carbon with $SO_2$ and sulfur. Potential soot may be washed from the system by the introduction of liquid sulfur, which is recycled to enable consumption of extracted carbon. The resultant vapor stream is rapidly cooled to 425° C. or less to suppress further formation of undesirable organic sulfur byproducts. Elemental sulfur is recovered and recycled to the reactor for gasification of extracted carbon solids and tars.

Further sulfur recovery is achieved as the process gas proceeds through a series of conventional catalytic Claus stages.

In 1965, the Ontario Research Foundation began investigating removal of $SO_2$ from smelter off-gases. A process was proposed wherein sulfur dioxide is removed from a sulfur dioxide containing effluent gas by reacting the sulfur dioxide in the effluent gas with a reducing gas comprising hydrogen sulfide in a presence of a catalyst in accordance with the equation:

$$SO_2 + 2H_2S \rightarrow 3S_2 + 2H_2O$$

at a temperature of at least 50° C. The reducing gas is formed by reaction of hydrocarbon fuel, steam and sulfur at a temperature of about 500° C. to about 900° C. The temperature is generated by the combustion of hydrocarbon fuel (Canadian patent 846,697, Removal of Sulphur Dioxide from Waste Gases, Sefton, V. B., Wilkalis, Ontario Research Foundation, Jul. 14, 1970).

A disadvantage of the Ontario Research Foundation process is that a large amount of steam is required to minimize byproduct COS or $CS_2$ in the reducing gas. Accordingly, a large amount of water and energy are consumed in order to provide steam to the process. The water can also have the effect of limiting the conversion of $SO_2$ to sulfur in the above reaction.

In a similar process, a reducing agent and preheated sulfur at a temperature of 500° C. to 650° C. are contacted in a furnace to produce a reducing gas that comprises $H_2S$ and $CS_2$. The reducing gas is mixed with an $SO_2$ containing stream and contacted by a catalyst in a reactor wherein sulfur is produced and $CS_2$ is concurrently hydrolyzed to $SO_2$ and $CO_2$. (U.S. Pat. No. 7,485,281 B2, Rameshni, M., Process for the Production of Sulfur from Sulfur Dioxide, Feb. 3, 2009).

One disadvantage of this process is that the sulfur must be preheated to 500° C. to 650° C. before mixing with the reducing agent to improve reaction kinetics. Such high temperature may cause increased corrosion of the process equipment.

Another disadvantage is that a high concentration of $CS_2$ is produced in the $H_2S$ generator. $CS_2$ is known to be a highly toxic chemical and an explosion hazard with an exceptionally low auto ignition temperature of 90° C. in air, significantly below the operating temperature of the process.

This application for patent discloses processes for the production of elemental sulfur from sulfur dioxide.

BRIEF SUMMARY OF THE INVENTION

The present invention relates to a process for recovering sulfur from sulfur dioxide ($SO_2$) containing gases. Key advantages are lower fuel consumption, reduced emissions, better product sulfur quality, better operational stability and increased safety.

In accordance with aspects of the present invention, a reducing gas, for example methane, methanol, or a $H_2$ and CO mixture, is reacted with elemental sulfur and recycled tail gas, which comprises $H_2O$ and $CO_2$, to produce a reducing gas that contains hydrogen sulfide. The $H_2S$ containing reducing gas is then reacted with a stream that contains $SO_2$ to produce elemental sulfur, a portion of which may be recycled to the first step of the process. A portion of the tail gas is recycled to first step of the process.

In accordance with further aspects of the present invention, processes for the production of sulfur from sulfur dioxide ($SO_2$)-containing effluent streams are described, wherein the processes comprise contacting a reducing agent with elemental sulfur and recycled tail gas at a first elevated temperature for a period of time sufficient to produce a reducing gas effluent stream comprising hydrogen sulfide; contacting the reducing gas with a sulfur dioxide-containing stream to generate a feed gas mixture stream; contacting the feed gas mixture stream with an activated catalyst in a reaction zone at a temperature effective for the reaction between hydrogen sulfide and sulfur dioxide to generate a tail gas stream comprising elemental sulfur and water; recovering the elemental sulfur from the tail gas stream; and recycling a portion of the tail gas stream to the first step in the process.

In accordance with another aspect of the present invention, a process for converting sulfur dioxide is described, wherein the process comprises introducing a reducing agent into a heater, introducing elemental sulfur into a heater; introducing recycled tail gas into a heater; contacting the reducing agent, elemental sulfur, and recycled tail gas at a temperature ranging from about 400° C. to about 1000° C. in a H2S generator zone for a period of time sufficient to form an effluent stream comprising $H_2S$, COS, or $CS_2$; contacting the effluent stream with recycled tail gas, comprising $H_2O$, and $CO_2$ in a hydrolysis zone at a temperature ranging from about 200° C. to about 400° C. for a period of time sufficient to hydrolyze COS or $CS_2$ to $H_2S$ and $CO_2$ to form a reducing gas comprising $H_2S$; contacting the reducing gas with a sulfur dioxide-containing effluent stream in a reaction zone at an elevated temperature for a time sufficient to form a product gas stream comprising elemental sulfur; cooling the product gas stream in one or more sulfur condensers to condense and recover elemental sulfur and produce a tail gas; recycling a portion of the recovered sulfur to the first step in the process; and, recycling at least a portion of the tail gas to the second reactor.

BRIEF DESCRIPTION OF THE SEVERAL VIEWS OF THE DRAWING

The following figures are part of the present disclosure and are included to further illustrate certain aspects of the present invention. Aspects of the invention may be understood by reference to one or more figures in combination with the detailed written description of specific embodiments presented herein.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or the scope of the inventive concepts or the appended claims in any manner. Rather, the figures and detailed written descriptions are provided to illustrate the inventive concepts to a person of ordinary skill in the art and enable such person to make and use the inventive concepts.

DETAILED DESCRIPTION OF THE INVENTION

An illustrative embodiment incorporating the invention disclosed herein is presented below. Not all features of an actual implementation are described or shown in this application for the sake of clarity. It is understood that in the development of an actual embodiment incorporating the present invention, numerous implementation-specific decisions must be made to achieve the developer's goals, such as compliance with system-related, business-related, government-related and other constraints, which vary by implementation and from time to time. While a developer's efforts might be complex and time-consuming, such efforts would be, nevertheless, a routine undertaking for those of ordinary skill the art having benefit of this disclosure.

In general terms, Applicant has created new process converting sulfur-dioxide and sulfur-dioxide-containing effluents into elemental sulfur.

Not all valves and the like necessary for the performance of the process have been shown in the interest of conciseness.

Figure 1:
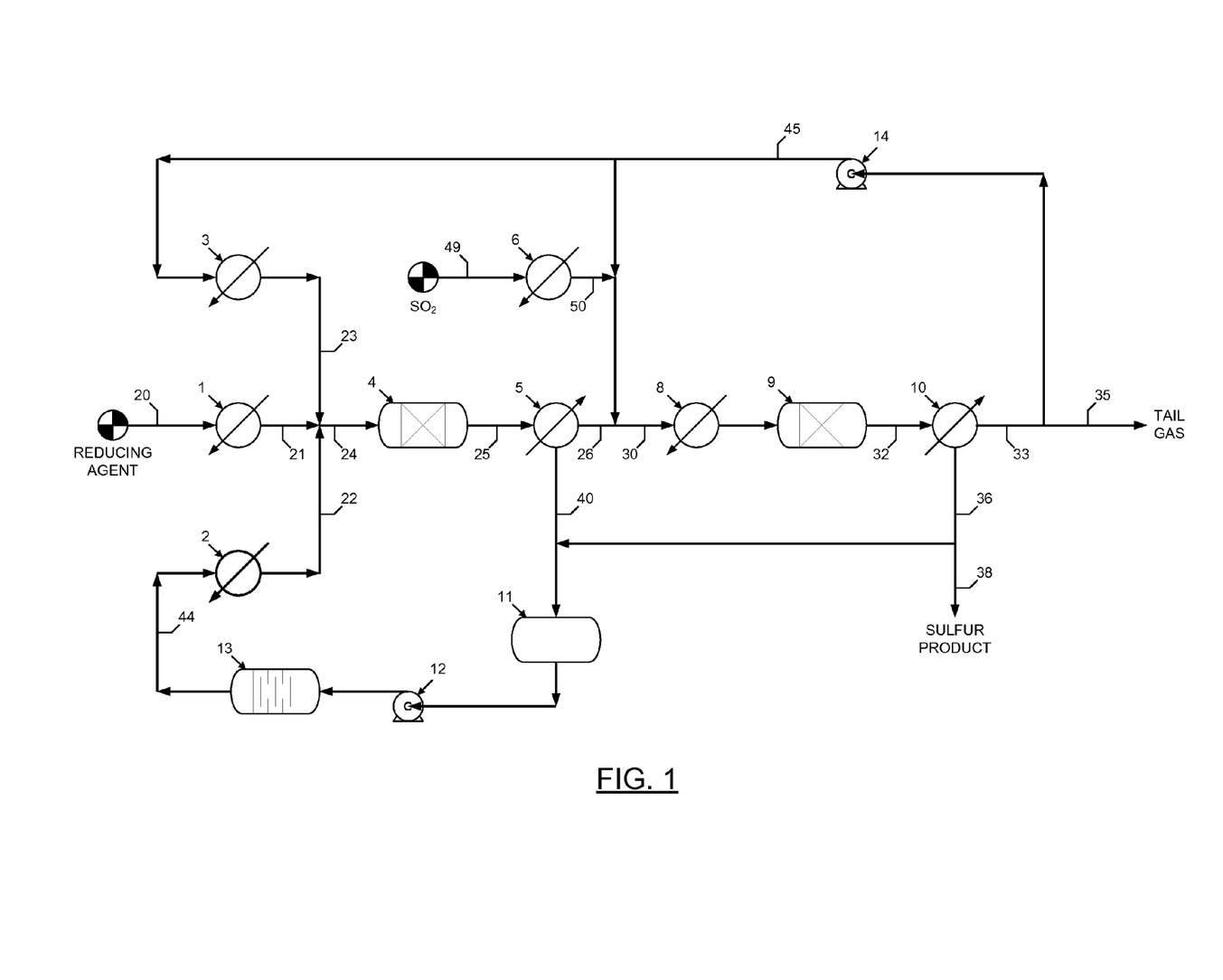
FIG. 1 illustrates a schematic diagram of an embodiment of the present invention.

In FIG. 1, a reducing agent (20) comprising a hydrocarbon, methanol, a hydrogen and carbon monoxide mixture, or mixtures thereof, is heated in a first heater (1) to a temperature from about 400° C. to about 650° C.

If a hydrocarbon is employed as reducing agent (20), or as a part of a reducing agent mixture, the hydrocarbon reducing agent may be selected from the group consisting of alkanes, alkenes, alkynes, cycloalkanes, aromatic hydrocarbons, and mixtures thereof.

In reference to reducing agent (20), and as used herein, the term hydrocarbon is meant to refer to those organic compounds (both saturated and unsaturated) composed solely of the elements hydrogen and carbon. Suitable hydrocarbon reducing agents for use herein include but are not limited to alkanes of the general formula $C_nH_{2n+2}$ (wherein 'n' is an integer greater than or equal to 1), such as methane, ethane, propane, n-octane, and the like, as well as mixtures of alkanes; alkenes of the general formula $C_nH_{2n}$ (wherein 'n' is an integer greater than or equal to 1), including 1-butene and 1-propene, and mixtures of alkenes; alkynes of the general formula $C_nH_{2n-2}$ (wherein 'n' is an integer greater than or equal to 1), and mixtures of alkynes; cycloalkanes of the general formula $C_nH_{2n}$ (wherein 'n' is an integer greater than or equal to 1), including cyclohexane and other "naphthenes", as well as mixtures thereof; aromatic compounds of the general formula $C_nH_{2n-6}$, including both monocyclic (benzene) and polycyclic (napthene) aromatics; as well as mixtures of the above described hydrocarbons. Suitable reducing agents can also be formed by the combustion of a hydrocarbon in the presence of an amount of oxygen insufficient for the complete oxidation of the hydrocarbon.

Liquid sulfur (44) is heated, vaporized, and further superheated to a temperature of about 450° C. to 650° C. in a second heater (2). The liquid sulfur boils at about 445° C., and vaporizes at about 450° C., at which temperature it exists mainly as orthorhombic sulfur ($S_8$). Subsequent superheating to a temperature ranging from about 500° C. to about 650° C. results in endothermic decomposition to smaller, more reactive, species (e.g., $S_6$ and $S_2$). This dissociation is also favored by the reduction in partial pressure of the sulfur vapor as the sulfur is combined with the other reactants. Consequently, it is desirable to preheat the sulfur vapor to the maximum reaction temperature before combination with the reducing agent, to minimize the temperature drop resulting from the endothermic dissociation of the sulfur.

Recycled tail gas (45), comprising $H_2O$ and $CO_2$, is preheated in a third heater (3) to a temperature from about 400° C. to about 650° C. The composition of the recycled tail gas (45) will depend on the compositions of the reducing agent (20) and $SO_2$ (49) feed streams. For example, if methane is used as the reducing agent and the $SO_2$ stream is pure $SO_2$, the molar ratio of $H_2O$ to $CO_2$ in the recycled tail gas (45) will be about 2:1 and the $H_2O$ concentration will be about 64% by volume with the balance comprising $CO_2$, unreacted $H_2S$ and $SO_2$, and residual sulfur. The $H_2O$ content of the recycled tail gas will be in the range of about 20% to 80% by volume and molar ratio of $H_2O$ to $CO_2$ will be in the range of about 1:2 to 5:1. It is presently preferred that the $H_2O$ content of the recycled tail gas be at least 50% by volume.

The reducing agent, liquid sulfur and recycled tail gas heaters (1,2,3) may be any suitable heater, externally-fired heater, furnace, reactor or generator, such as those externally fired systems commonly used in ethylene cracking operations or $CS_2$ production. Fuel may be combusted to provide heat. The fuel may be any suitable fuel, including, but not limited to, gaseous fuels (such as methane or propane), liquid fuels (such as kerosene, diesel, or other fuel oil), solid fuels (such as coal or coke), or combinations thereof. In a preferred embodiment of the heaters, heat transfer to the transfer coils occurs primarily by radiation with little or no direct contact of the flame. The heaters may be placed inside the same radiant heater box.

The preheated reducing agent (21), sulfur (22) and recycled tail gas (23) are combined into a feed stream (24) and introduced to an $H_2S$ generator zone (4), wherein the reducing agent and sulfur react at a temperature in the range of about 400° C. to about 1000° C. The primary reactions that may occur are:

$$CH_4+2S_2 \rightarrow CS_2+2H_2S$$

$$2CH_3OH+2S_2 \rightarrow 2COS+2H_2S$$

$$2H_2+S_2 \rightarrow 2H_2S$$

$$CO+S_2 \rightarrow 2\ COS$$

All or part of the $CS_2$ or COS that are formed are immediately hydrolyzed by the $H_2O$ contained in the recycled tail gas stream according to the following reactions:

$$CS_2+H_2O \rightarrow H_2S+COS$$

$$COS+H_2O \rightarrow H_2S+CO_2$$

The $H_2S$ generator zone (4) may comprise a radiantly heated pipe coil, one or more reactors that contain fixed catalyst beds, or combinations thereof. The catalyst used in the fixed catalyst bed reactors if present, may be any of the catalysts commonly used in $CS_2$ production plants, for example, activated alumina or silica gel. If more than one fixed catalyst bed reactor is employed, inter-stage heating or cooling of the process gas may be required to maintain the temperature in the preferred range.

The amount of reducing agent fed to the unit may be controlled to maintain the mole ratio of $H_2S$ to $SO_2$ in the tail gas stream (35). It is presently preferred that the $H_2S$ to $SO_2$ mole ratio be controlled so as to be in a range from about 2:1 and about 5:1.

Excess sulfur may be fed to the $H_2S$ generator zone to maximize conversion of the reducing agent and to minimize side reactions. It is presently preferred that the excess sulfur be fed at a rate at least 5% to 10% above the rate required for completion of the reactions.

Recycled tail gas supplies $H_2O$ for the hydrolysis reactions that occur in the $H_2S$ generator zone. The rate may be controlled to provide sufficient $H_2O$ to hydrolyze any $CS_2$ to COS or to hydrolyze $CS_2$ and COS to $H_2S$. Recycled tail gas may be fed at a rate to supply $H_2O$ up to 50% above the rate required for completion of the hydrolysis reaction to minimize residual COS in the effluent gas (25). Recycled tail gas also has the effect of moderating the temperature in the $H_2S$ generator zone and the rate may be adjusted to maintain the temperature in the preferred range.

The effluent gas (25) from the $H_2S$ generator zone is cooled to condense sulfur in the No. 1 Sulfur condenser (5). The gas is cooled to about 150° C. to 200° C. by the generation of low-pressure steam to condense most of the residual sulfur vapor, which then drains to the collection vessel (11) through one or more drain lines (40). The number of coolers and cooling medium may be adjusted without affecting the process.

With continued reference to FIG. 1, a sulfur dioxide ($SO_2$) stream (49) with a molar concentration of $SO_2$ ranging from about 1% to about 100% is then introduced to the unit. The sulfur dioxide stream can come from any number of suitable $SO_2$ sources, including but not limited to tail gas streams from any number of process plants, the condensation of enriched stripper gases, tail gas effluent, and the like; from the combustion of fossil fuels; from the burning of crude oils; from the smelting of sulfide ores such as iron pyrites and sphalerite (zinc blende); and heating calcium sulfate (gypsum) with coke and sand in the manufacture of cement. In accordance with an aspect of the present invention, the $SO_2$ stream is preferably pretreated to remove particulate material and concentrate the stream to a molar concentration ranging from about 25% to about 100% before entering the unit, although removal of particulates and concentration is not necessary for operation of the presently described process. The $SO_2$ stream is heated in an $SO_2$ preheater (6) and the heated $SO_2$ stream (50) is combined with the $H_2S$ stream (26). The combined stream (30) is heated to about 210° C. in the No. 1 repeater (8) and enters reactor No. 1 sulfur reactor (9) containing a fixed bed of activated catalyst, preferably an alumina or titania catalyst of the type normally employed in Claus sulfur recovery units. In the reactor, $H_2S$ and $SO_2$ react to form elemental sulfur according the following reaction:

$$2H_2S + SO_2 \rightarrow 3/X\, S_{X+2} + 2H_2O$$

Carbonyl sulfide (COS) and carbon disulfide ($CS_2$), if present, may be concurrently hydrolyzed in the reactor to form hydrogen sulfide ($H_2S$) according the following reactions:

$$COS + H_2O \rightarrow H_2S + CO_2$$

$$CS_2 + 2H_2O \rightarrow 2H_2S + CO_2$$

No. 1 sulfur reactor effluent gas (32) is cooled to about 150° C. to 200° C. by the generation of low-pressure steam in the No. 2 sulfur condenser (10) to condense most of the residual sulfur vapor, which drains to the collection header stream (36). The number of coolers and cooling medium may be adjusted without affecting the process.

A portion of the No. 2 sulfur condenser tail gas stream (33) is recycled to front-end of the process, via a recycle blower (14) or other suitable device, such as an ejector. When processing a concentrated $SO_2$ stream, a portion of the effluent from the blower (45) may be mixed with the preheated $SO_2$ (50) and $H_2S$ gas (26) to dilute the reactants as necessary to limit the exothermic temperature rise in the No. 1 sulfur reactor (9).

Ultimately, the tail gas stream (35) may be sent to one or more additional reaction stages, each comprising a repeater, sulfur rector and sulfur condenser, for further reaction of residual $H_2S$ and $SO_2$ to sulfur in order to increase sulfur recovery efficiency. If additional reaction stages are present, the recycled tail gas may be a portion of the tail gas from any of the reaction stages.

A portion of the No. 2 sulfur condenser recovered sulfur (36) is combined with the No. 1 sulfur condenser recovered sulfur (40) and collected in the collection vessel (11). Collected sulfur is transferred from the collection vessel (11) to the sulfur heater (2) by the sulfur recycle pump (12). A sulfur filter (13) may be installed to remove carbon, ash and other particulates that may foul the heater tubes and catalyst beds.

The process is able to achieve an overall sulfur recovery efficiency of greater than 95% based on the theoretical amount of recoverable sulfur. For example, the sulfur recovery efficiency may be about 98% with a concentrated $SO_2$ feed stream and three reaction stages. The tail gas stream (35) may also be incinerated and discharged to atmosphere or treated in any of the tail gas treating units used to treat Claus sulfur recovery unit tail gases, including but not limited to sub-dew point processes, to achieve nearly 100% sulfur recovery efficiency.

The liquid sulfur product (38) is collected in a sulfur pit or other collection device and may be sold, discarded, handled by others, or shipped, as appropriate.

Figure 2:
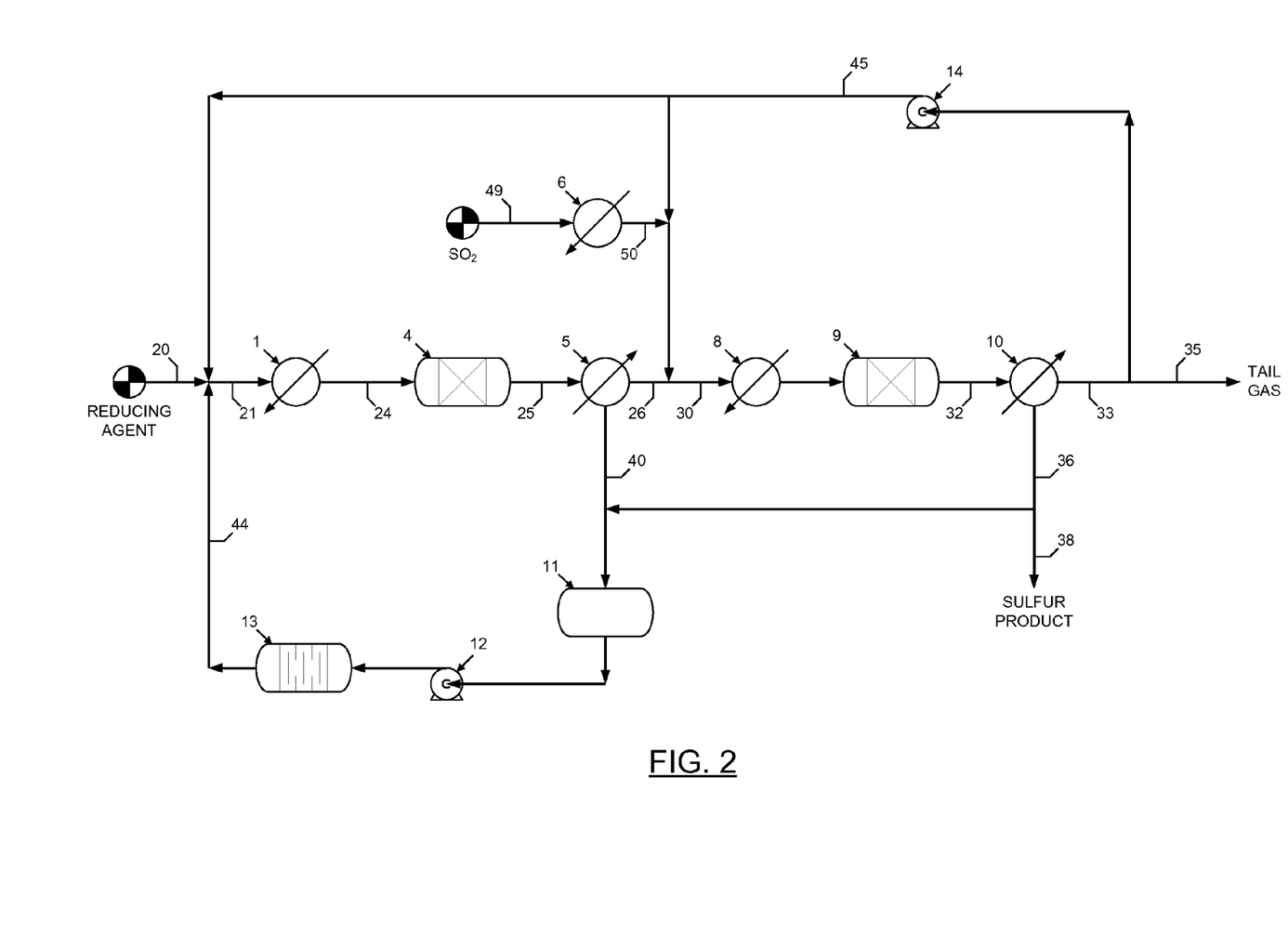
FIG. 2 illustrates a schematic diagram of an alternate embodiment of the present invention in which the reducing agent, sulfur and recycled tail gas are combined and heated in a single exchanger.

In FIG. 2, an alternate embodiment of the present invention is illustrated. In this embodiment, the reducing agent (20), liquid sulfur (44) and recycled tail gas (45) are combined and fed to a single heater (1). The mixing of the streams prior to heating, reduces the partial pressure of sulfur promoting dissociation to smaller, more reactive species, thus avoiding the endothermic temperature drop when the preheated streams are mixed and, therefore, allowing for lower temperatures which may reduce corrosion of the heater tubes. In accordance with other aspects of the present invention, the sulfur may be heated with either of the other streams with the third stream heated separately.

Figure 3:
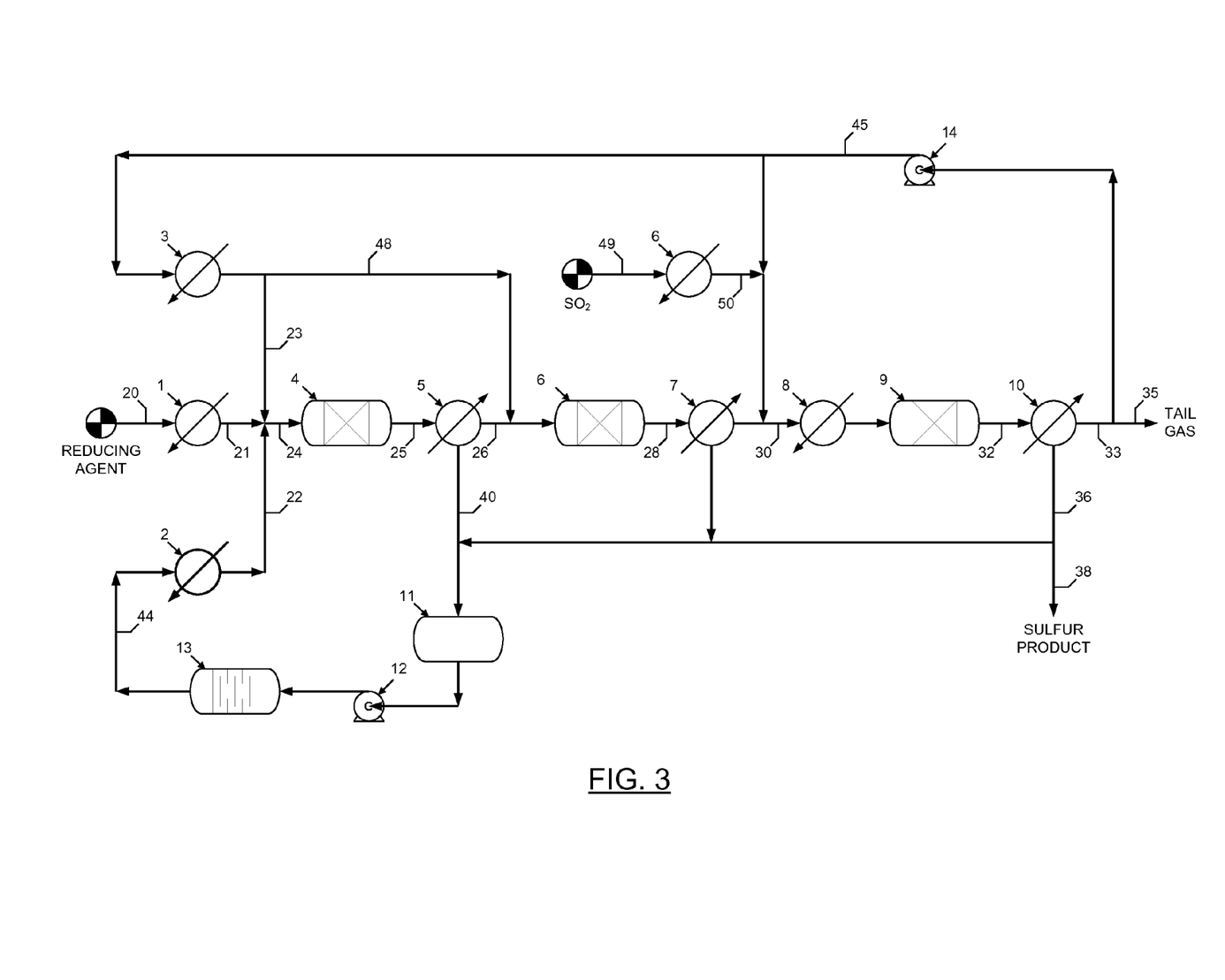
FIG. 3 illustrates a schematic diagram of an alternate embodiment of the present invention in which the recycled tail gas is, at least in part, directed to a hydrolysis reaction zone.

In FIG. 3, an alternate embodiment of the invention is illustrated. In this embodiment, the $H_2S$ production reactions are carried out in two stages. Recycled tail gas (45) is heated in a heater (3). A portion of the heated gas (23) may be mixed with the reducing agent (21) and sulfur reactants (22) before the $H_2S$ generator zone. The $H_2O$ in the recycled tail gas acts to hydrolyze some of the COS or $CS_2$ produced in the $H_2S$ generation zone (4). The effluent gas (25) is cooled to condense sulfur in the No. 1 sulfur condenser (5). The balance of the heated recycled tail gas (48) mixes with the No. 1 sulfur condenser effluent gas (26) and the mixture is contacted in a hydrolysis reactor (6) which contains a fixed-bed of catalyst, preferably an alumina or titania catalyst of the type normally employed in COS hydrolysis unit. The hydrolysis reactor, preferably operates in a temperature range from about 200° C. to 400° C. Such temperature is more favorable for completion of the hydrolysis reactions. The more favorable temperature in the hydrolysis reactor allows the recycled tail gas rate to be reduced to supply less than 25% excess $H_2O$ above the amount required for completion of the hydrolysis reactions. The hydrolysis reactor effluent gas (28) is cooled to recover sulfur in the sulfur condenser (7).

All of the compositions, methods, processes and/or apparatus disclosed and claimed herein can be made and executed without undue experimentation in light of the present disclosure. While the compositions and methods of this invention have been described in terms of preferred embodiments, it will be apparent to those of skill in the art that variations may be applied to the compositions, methods, processes and/or apparatus and in the steps or sequence of steps of the methods described herein without departing from the concept and scope of the invention. Additionally, it will be apparent that certain agents which are both chemically and functionally related may be substituted for the agents described herein while the same or similar results would be achieved. All such similar substitutes or modifications apparent to those skilled in the art are deemed to be within the scope and concept of the invention. The disclosed and undisclosed embodiments are not intended to limit or restrict the scope or applicability of the invention conceived of by the Applicant, but rather, in conformity with the patent laws, Applicants intends to protect all such modifications and improvements to the full extent that such falls within the scope or range of equivalents of the following claims.

We claim:

1. A process for the production of sulfur from sulfur dioxide ($SO_2$)-containing effluent streams, the process comprising:
    contacting a reducing agent with elemental sulfur and a recycled tail gas stream at a first elevated temperature in an $H_2S$ generator zone for a period of time sufficient to produce a reducing gas effluent stream comprising hydrogen sulfide ($H_2S$);
    contacting the reducing gas with a sulfur dioxide-containing stream to generate a feed gas mixture stream;
    contacting the feed gas mixture stream with an activated catalyst in a reaction zone at a temperature effective for the reaction between hydrogen sulfide and sulfur dioxide to generate a tail gas stream comprising elemental sulfur and water;
    recovering the elemental sulfur from the tail gas stream; and
    recycling a portion of the tail gas stream to the $H_2S$ generator zone.

2. The process of claim 1, wherein the reducing agent comprises hydrocarbons, methanol, or a mixture of carbon monoxide and hydrogen.

3. The process of claim 2, wherein the hydrocarbon reducing agent is selected from the group consisting of alkanes, alkenes, alkynes, cycloalkanes, aromatic hydrocarbons, and mixtures thereof.

4. The process to claim 1, wherein the recycled tail gas is added to the feed streams prior entering the $H_2S$ generator to prevent $CS_2$ formation.

5. The process to claim 1, wherein the recycled tail gas is added to moderate the temperature in the $H_2S$ generator zone.

6. The process to claim 1, wherein the recycled tail gas is from the outlet of the second or third reaction stages, if present.

7. The process of claim 1, wherein the first mixture feed streams elevated temperature is in the range from about 400° C. to about 1000° C.

8. The process of claim 1 in which about 100% sulfur recovery efficiency is achieved.

9. The process of claim 1, wherein the reducing gas effluent stream further comprises $CS_2$ or COS.

10. The process of claim 1, further comprising contacting the reducing agent, elemental sulfur and recycled tail gas in one or more reactors for a period of time sufficient to effect further reaction of the recycled tail gas stream, the elemental sulfur and the reducing agent.

11. The process of claim 10, wherein the one or more reactors contain a catalyst.

12. The process of claim 1, wherein the sulfur dioxide-containing stream comprises $SO_2$ in a molar concentration ranging from about 1 mol % to about 100 mol %.

13. The process of claim 12, wherein the sulfur dioxide containing stream comprises $SO_2$ in a molar concentration ranging from about 25 mol % to about 100 mol %.

14. The process of claim 1, wherein the $H_2S$-containing gas is contacted with the sulfur dioxide-containing stream in an amount such that the mole ratio of hydrogen sulfide to sulfur dioxide in the gaseous-mixture reaction stream ranges from about 2:1 to about 5:1.

15. The process of claim 1, wherein the recovering process comprises cooling the product gas stream in one or more sulfur condensers to condense and recover elemental sulfur from the product gas stream.

16. The process of claim 1, further comprising removing particulate material from the sulfur dioxide-containing stream.

17. The process of claim 1, wherein the amount of elemental sulfur contacted with the reducing agent ranges from about 5 wt. % to about 10 wt. % greater than the amount of reducing agent.

18. The process of claim 1, wherein the activated catalyst in the reaction zone wherein the feed gas mixture stream comprising a reducing gas and sulfur dioxide is contacted is a fixed bed catalyst.

19. The process of claim 18, wherein the fixed bed catalyst comprises alumina or titania.

20. The process of claim 1, wherein COS and $CS_2$ are concurrently hydrolyzed in the reaction zone to form at least $H_2S$ and $CO_2$.

21. The process of claim 1, further comprising recycling a portion of the tail gas stream back into the reaction zone.

22. The process of claim 1, further comprising conveying at least a portion of the tail gas stream through one or more additional reaction stages, the reaction stages comprising a re-heater, a sulfur reactor, a sulfur condenser, and combinations thereof.

23. The process of claim 1 in which a portion of the produced sulfur is recycled to the $H_2S$ generator zone.

24. The process of claim 1, wherein the amount of elemental sulfur recovered from the product gas stream is greater than about 95% based on the theoretical amount of recoverable elemental sulfur.

25. The process of claim 1, wherein one or more of the reducing agent, liquid sulfur and recycled tail gas heaters is an externally-fired heater, furnace, reactor or generator, of the type used in ethylene cracking operations or $CS_2$ production.

26. The process of claim 25, wherein in a preferred embodiment of the heaters, heat transfer to the transfer coils occurs primarily by radiation with little or no direct contact of the flame.

27. The process of claim 25, wherein, the heaters are placed inside the same radiant heater box.

28. The process of claim 1, wherein, all or part of the $CS_2$ or COS that are formed are immediately hydrolyzed by the $H_2O$ contained in the recycled tail gas stream.

29. The process of claim 1, wherein, the $H_2S$ generator zone comprises comprise a radiantly heated pipe coil, one or more reactors that contain fixed catalyst beds, or combinations thereof.

30. The process of claim 29, wherein, the catalyst used in the fixed catalyst bed reactors, if present, comprises a catalyst of the type used in $CS_2$ production plants.

31. The process of claim 30, wherein, if more than one fixed catalyst bed reactor is employed, inter-stage heating or cooling of the process is used to maintain the temperature in the preferred range.

32. The process of claim 1, wherein, recycled tail gas supplies $H_2O$ for the hydrolysis reactions that occur in the $H_2S$ generator zone.

33. The process of claim 32, wherein, the recycled tail gas rate is controlled to provide sufficient $H_2O$ to hydrolyze any $CS_2$ to COS or to hydrolyze $CS_2$ and COS to $H_2S$.

34. The process of claim 32, wherein, recycle tail gas is fed at a rate to supply $H_2O$ up to 50% above the rate required for completion of the hydrolysis reactions.

35. A process of claim 1, wherein, a portion of the tail gas stream is recycled to front-end of the process, via a recycle blower or ejector.

36. The process of claim 1, wherein, the tail gas stream is incinerated and discharged to atmosphere or treated in any of the tail gas treating units used to treat Claus sulfur recovery unit tail gases, including but not limited to sub-dew point processes.

37. The process of claim 1, wherein, the sulfur is filtered to remove carbon, ash and other particulates.

38. The process of claim 1, wherein, the reducing agent, liquid sulfur and recycled tail gas are combined and fed to a single heater.

39. The process of claim 1, wherein, the sulfur is heated with either of the other streams with the third stream heated separately.

40. The process of claim 1, wherein the $H_2S$ production reactions are carried out in two stages.

41. The process of claim 40, wherein, at least a portion of the recycled tail gas gas is mixed with the reducing agent and sulfur reactants before the $H_2S$ generator zone.

42. The process of claim 1, wherein, the recycled tail gas comprises $H_2O$ and $CO_2$.

43. The process of claim 42, wherein, the $H_2O$ content of the recycled tail gas is in the range of about 20% to 80% by volume.

44. The process of claim 42, wherein, the molar ratio of $H_2O$ to $CO_2$ is in the range of about 1:2 to 5:1.

45. The process of claim 42, wherein, the $H_2O$ content of the recycled tail gas is at least 50% by volume.

\* \* \* \* \*